United States Patent
Thomason

(10) Patent No.: US 9,880,695 B2
(45) Date of Patent: *Jan. 30, 2018

(54) CHANGING A CONTROLLING DEVICE INTERFACE BASED ON DEVICE ORIENTATION

(71) Applicant: International Business Machines Corporation, Armonk, NY (US)

(72) Inventor: Michael S. Thomason, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 329 days.

This patent is subject to a terminal disclaimer.

(21) Appl. No.: 14/701,705

(22) Filed: May 1, 2015

(65) Prior Publication Data
US 2016/0320955 A1 Nov. 3, 2016

(51) Int. Cl.
*G06K 7/10* (2006.01)
*G06F 3/0481* (2013.01)
(Continued)

(52) U.S. Cl.
CPC .......... *G06F 3/0481* (2013.01); *G05B 15/02* (2013.01); *G06F 3/017* (2013.01); *G06F 3/0484* (2013.01);
(Continued)

(58) Field of Classification Search
USPC ........ 345/173, 158; 340/12.28, 12.53, 13.23, 340/4.31, 539.11; 455/420, 557;
(Continued)

(56) References Cited

U.S. PATENT DOCUMENTS

| 9,014,685 | B2 * | 4/2015 | Bathiche | ............... | H04L 12/282 |
| | | | | | 455/420 |
| 2003/0080874 | A1 | 5/2003 | Yumoto et al. | | |

(Continued)

FOREIGN PATENT DOCUMENTS

| KR | 20140059697 A | 5/2014 |
| WO | 2013/067526 A1 | 5/2013 |
| WO | 2014185808 A1 | 11/2014 |

OTHER PUBLICATIONS

IBM, "List of IBM Patents or Patent Applications Treated as Related (Appendix P)," Nov. 15, 2016, p. 1-2.

(Continued)

*Primary Examiner* — Doon Chow
*Assistant Examiner* — Wendy Nicholas
(74) *Attorney, Agent, or Firm* — Michael O'Keefe

(57) ABSTRACT

According to one embodiment, a method for changing a graphical user interface is provided. The method may include identifying one or more devices. The method may include determining product information associated with the one or more devices, whereby the product information includes at least one of a type, a model number, and a brand. The method may include determining one or more applications associated with the one or more devices based on the product information, whereby the one or more applications allow for operation of the one or more devices. The method may include retrieving the one or more applications. The method may include determining that the computer is oriented toward a first device of the one or more devices. The method may include displaying a first graphical user interface corresponding to a first application of the one or more applications that allows for operation of the first device.

20 Claims, 5 Drawing Sheets

(51) Int. Cl.

| | | |
|---|---|---|
| *G06F 3/0484* | (2013.01) | |
| *G05B 15/02* | (2006.01) | |
| *G09G 5/12* | (2006.01) | |
| *G06K 9/62* | (2006.01) | |
| *G06Q 30/06* | (2012.01) | |
| *G06K 9/22* | (2006.01) | |
| *G06T 7/73* | (2017.01) | |
| *G06F 3/01* | (2006.01) | |
| *G06F 17/30* | (2006.01) | |
| *G08C 17/02* | (2006.01) | |

(52) U.S. Cl.
CPC ...... *G06F 3/04842* (2013.01); *G06F 3/04847* (2013.01); *G06F 17/30864* (2013.01); *G06K 7/10009* (2013.01); *G06K 9/228* (2013.01); *G06K 9/62* (2013.01); *G06Q 30/0625* (2013.01); *G06T 7/74* (2017.01); *G08C 17/02* (2013.01); *G09G 5/12* (2013.01); *G08C 2201/30* (2013.01); *G08C 2201/70* (2013.01); *G09G 2370/06* (2013.01)

(58) Field of Classification Search
USPC .................................. 715/736, 753, 771, 773
See application file for complete search history.

(56) References Cited

U.S. PATENT DOCUMENTS

| | | | |
|---|---|---|---|
| 2006/0256007 A1 | 11/2006 | Rosenberg | |
| 2008/0270561 A1 | 10/2008 | Tang et al. | |
| 2009/0253508 A1 | 10/2009 | Koontz, II | |
| 2010/0076857 A1 | 3/2010 | Deo et al. | |
| 2010/0250337 A1 | 9/2010 | Kassaei | |
| 2010/0317332 A1* | 12/2010 | Bathiche | H04L 12/282 455/418 |
| 2011/0269484 A1 | 11/2011 | Cazanas et al. | |
| 2012/0162073 A1* | 6/2012 | Kryze | G06F 1/266 345/158 |
| 2012/0210268 A1* | 8/2012 | Hilbrink | G06F 3/0484 715/773 |
| 2013/0159857 A1* | 6/2013 | Zaloshnja | H04L 65/605 715/716 |
| 2013/0241697 A1 | 9/2013 | Baumert et al. | |
| 2014/0068638 A1 | 3/2014 | Seo | |
| 2014/0123022 A1 | 5/2014 | Lee et al. | |
| 2014/0193157 A1* | 7/2014 | Du | G08C 23/04 398/106 |
| 2014/0229858 A1 | 8/2014 | Bleker et al. | |
| 2014/0244001 A1 | 8/2014 | Glickfield et al. | |
| 2014/0317303 A1 | 10/2014 | Toprani et al. | |
| 2014/0375442 A1* | 12/2014 | Wong | G08C 17/02 340/12.53 |
| 2015/0130957 A1 | 5/2015 | Berelejis et al. | |
| 2015/0334165 A1* | 11/2015 | Arling | G05B 15/02 717/177 |
| 2016/0029458 A1 | 1/2016 | Liu et al. | |
| 2016/0320934 A1 | 11/2016 | Thomason | |

OTHER PUBLICATIONS

Thomason, "Changing a Controlling Device Interface Based on Device Orientation," Application and Drawings, filed Sep. 26, 2016, 35 Pages, U.S. Appl. No. 15/275,766.

Thomason, "Changing a Controlling Device Interface Based on Device Orientation," Application and Drawings, filed Sep. 26, 2016, 35 Pages, U.S. Appl. No. 15/275,778.

Pérez, "User Interface and Future Interaction Technologies," http://www.slideshare.net/carloshuertasperez5/user-interface-42201296, Dec. 1, 2014, pp. 1-32.

Hoopes, "Revolv brings multiple home automation devices together," http://www.gizmag.com/revolv-home-automation-system/30096/, Dec. 12, 2013, pp. 1-7.

Clark, "Happy Together," http://vimeo.com/86287024,vimeo.com, Vimeo, LLC, accessed on Feb. 9, 2015, pp. 1-3.

Clark, "Mind the Gap: Designing the Spaces Between," http://www.slideshare.net/joshclark/bdconf-joshclarkglobalmoxie, Nov. 5, 2014, 63 pages.

Mell et al, "The NIST Definition of Cloud Computing: Recommendations of the National Institute of Standards and Technology," Computer Security Division, Information Technology Laboratory, National Institute of Standards and Technology. Special Publication 800-145, Sep. 2011, 7 pages.

IBM, "List of IBM or Patent Applications Treated as Related (Appendix P)," Jun. 15, 2016, p. 1-2.

Thomason, "Changing a Controlling Device Interface Based on Device Orientation," Application and Drawings, filed Feb. 29, 2016, 35 Pages, U.S. Appl. No. 15/055,800.

* cited by examiner

CHANGING A CONTROLLING DEVICE INTERFACE BASED ON DEVICE ORIENTATION

FIELD OF INVENTION

The present invention relates generally to the field of computing, and more particularly to device controls.

BACKGROUND

A smart device is an electronic device that may be capable of connecting to the internet or communicating with other devices across a network. Networks connecting smart devices may be wired or wireless, such as through Bluetooth or WiFi. Smart devices may be categorized as mobile smart devices, such as smartphones and tablets, and non-mobile smart devices, such as digital video recorders, Blu-Ray disc players, digital versatile disc (DVD) players, thermostats and home theater systems. Devices, including smart devices, may be capable of downloading and installing applications across a network for use on the device or for interacting with other devices.

SUMMARY

According to one embodiment, a method for changing a graphical user interface is provided. The method may include identifying one or more devices. The method may also include determining product information associated with the one or more devices, whereby the product information includes at least one of a type, a model number, and a brand. The method may further include determining one or more applications associated with the one or more devices based on the product information, whereby the one or more applications allow for operation of the one or more devices. The method may also include retrieving the one or more applications. The method may further include determining that the computer is oriented toward a first device of the one or more devices. The method may also include displaying a first graphical user interface corresponding to a first application of the one or more applications that allows for operation of the first device.

According to another embodiment, a computer system for changing a graphical user interface is provided. The computer system may include one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method. The method may include identifying one or more devices. The method may also include determining product information associated with the one or more devices, whereby the product information includes at least one of a type, a model number, and a brand. The method may further include determining one or more applications associated with the one or more devices based on the product information, whereby the one or more applications allow for operation of the one or more devices. The method may also include retrieving the one or more applications. The method may further include determining that the computer is oriented toward a first device of the one or more devices. The method may also include displaying a first graphical user interface corresponding to a first application of the one or more applications that allows for operation of the first device.

According to yet another embodiment, a computer program product for changing a graphical user interface is provided. The computer program product may include one or more computer-readable tangible storage medium and program instructions stored on at least one of the one or more tangible storage medium, the program instructions executable by a processor. The computer program product may include program instructions to identify one or more devices. The computer program product may also include program instructions to determine product information associated with the one or more devices, whereby the product information includes at least one of a type, a model number, and a brand. The computer program product may further include program instructions to determine one or more applications associated with the one or more devices based on the product information, whereby the one or more applications allow for operation of the one or more devices. The computer program product may also include program instructions to retrieve the one or more applications. The computer program product may further include program instructions to determine that the computer is oriented toward a first device of the one or more devices. The computer program product may also include program instructions to display a first graphical user interface corresponding to a first application of the one or more applications that allows for operation of the first device.

DETAILED DESCRIPTION

Figure 1:
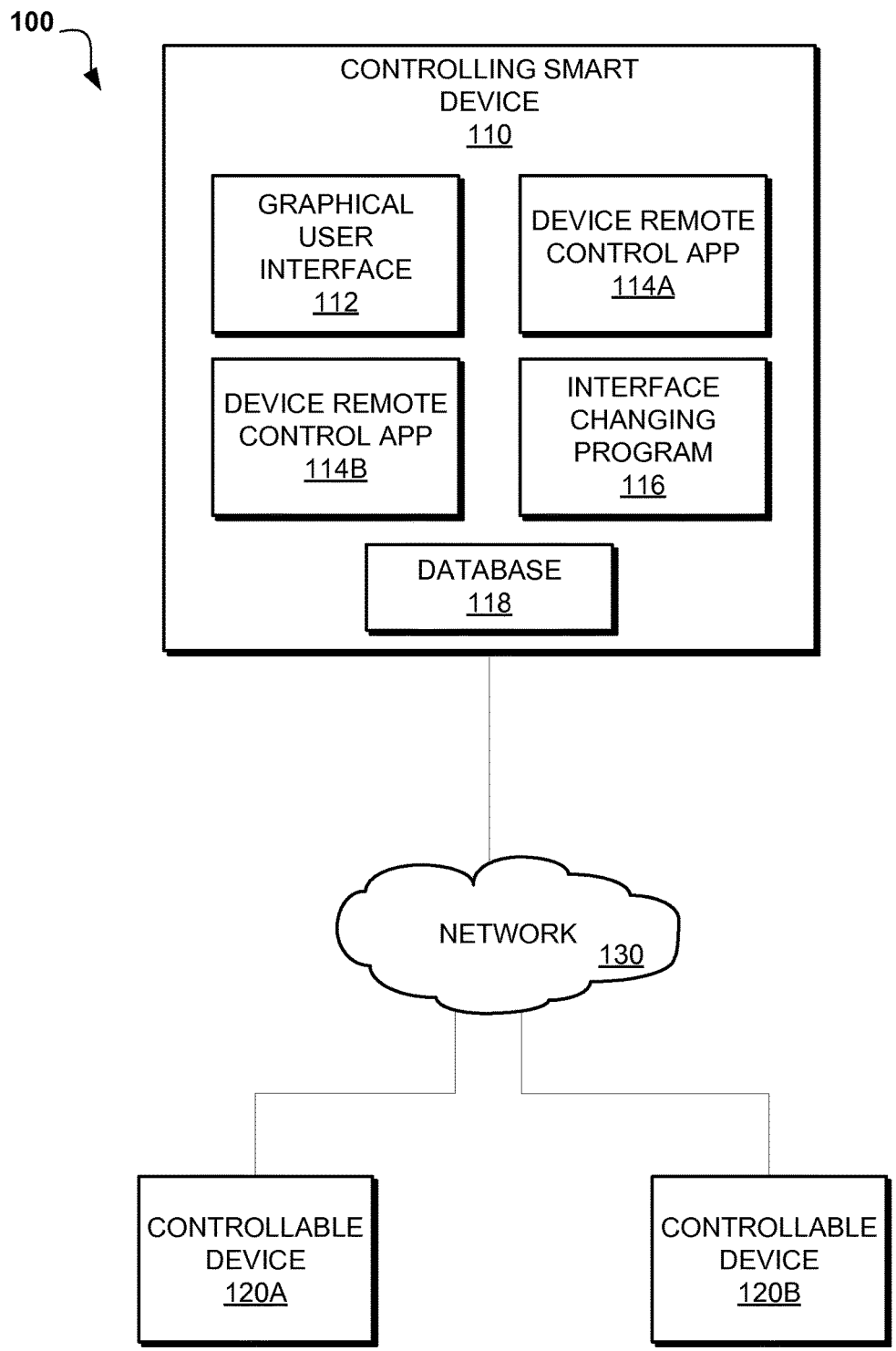
FIG. 1 is an illustration of an exemplary architecture for a device controller system, in accordance with one embodiment of the present invention.

Embodiments of the present invention are directed to controlling smart devices through a network.

When purchased, devices, including smart devices, may be packaged with a remote control device. A remote control may be any peripheral used to remotely operate the device to which it is paired. In addition to a physical remote control, many devices may be operated through a remote control interface on a mobile smart device, or mobile device, by downloading and installing a specialized application, or app. For example, a company that produces a television may also offer a downloadable application for mobile smart devices that allow the television to be controlled using the smart mobile device. When a user opens the downloaded app on the mobile smart device, the user may be presented with a graphical user interface that resembles the buttons on a physical control device.

An increasing number of devices are available in the market place that allow remote control through a graphical user interface on a mobile smart device. Many devices may only be controlled by a specific mobile application that requires user download and installation onto a mobile smart device. For example, a user may live in a house where the windows, doors, and lights may be controlled through a single application. Additionally, the user may own a television, a Blu-Ray player, and a thermostat that may each be remotely operated by a separately downloaded and installed application on a mobile device. User navigation between individually installed remote control applications may be burdensome on the user due to numerous such applications present on a mobile device. As such, it may be advantageous, among other things, to implement a system that changes a displayed remote control application on a mobile smart device based on the orientation of the mobile smart device in relation to the controllable device.

According to one embodiment, a graphical user interface displaying a remote control application on a mobile smart device and used to operate a controllable device may be changed based on the orientation of the mobile smart device in relation to the controllable device. By detecting controllable devices and the orientation of the mobile device, an application displaying controls for a controllable device on a mobile smart device may automatically change to controls for another controllable device when the mobile smart device is oriented towards the other controllable device for which an application is installed on the mobile smart device. For example, if a television and a thermostat are two controllable devices located within a room and a smartphone has a remote control application installed for each controllable device, the smartphone will display a graphical user interface for the television remote control application when the smartphone is oriented toward the television. When the smartphone is oriented toward the thermostat, the graphical user interface for the television remote control application will change to the graphical user interface for the thermostat remote control application. Therefore, embodiments of the present invention may have the capacity to improve the technical field of remotely controlling devices by implementing software that automatically changes a displayed graphical user interface according to the orientation of a mobile device in relation to a controllable device.

FIG. 1 is an illustration of an exemplary architecture for a device controller system, in accordance with one embodiment of the present invention. The device controller system 100 may include a controlling smart device 110 and a controllable device 120 interconnected over a network 130. Generally, the device controller system 100 may include a plurality of controlling smart devices 110 and controllable devices 120, in accordance with embodiments of the invention.

In various embodiments of the invention, a controlling smart device 110 may be, for example, a laptop computer, tablet computer, netbook computer, personal computer (PC), a desktop computer, a personal digital assistant (PDA), a smartphone, or any type of computing device capable of running a program, accessing a network, connecting with controllable smart device 120, and displaying a graphical user interface 112.

Controllable device 120 may be a laptop computer, netbook computer, personal computer (PC), a desktop computer, or any programmable electronic device capable of communicating with controlling smart device 110 via network 130, in accordance with embodiments of the invention. Controllable device 120 may include internal and external hardware components, as depicted and described in further detail below with reference to FIG. 3. Controllable device 120 may also operate in a cloud computing service model, such as Software as a Service (SaaS), Platform as a Service (PaaS), or Infrastructure as a Service (IaaS). Controllable device 120 may also be located in a cloud computing deployment model, such as a private cloud, community cloud, public cloud, or hybrid cloud. Generally, device controller system 100 may include a plurality of controllable devices 120A and 120B. For example, device controller system 100 may include a television, a Blu-Ray player, and a thermostat.

Controlling smart device 110 may communicate with controllable device 120 via communication network 130. In the example embodiment, controlling device 110 includes device remote control app 114, graphical user interface 112, interface changing program 116, and database 118. Communication network 130 may include various types of communication networks, such as a wide area network (WAN), local area network (LAN), a telecommunication network, a wireless network, a public switched network and/or a satellite network, and may include connections, such as wire, wireless communication links, or fiber optic cables. In general, communication network 130 can be any combination of connections and protocols that will support communications between controlling smart device 110 and controllable device 120, in accordance with embodiments of the invention.

Device remote control app 114 may be an application downloaded and installed to controlling smart device 110. Device remote control app 114 may allow controlling smart device 110 to control controllable device 120 by establishing a connection via network 130. Device remote control app 114 may display a plurality of virtualized buttons on graphical user interface 112 that resemble a physical remote control unit for controllable device 120. Generally, controlling smart device 110 may include a plurality of device remote control apps 114A and 114B. For example, controlling smart device 110 may include a device remote control app for operating a television and a separate device remote control app for operating a Blu-Ray player.

Interface changing program 116 may be a software application on controlling smart device 110 that allows a user to change the display of graphical user interface 112 depending on the orientation of controlling smart device 110. For example, when oriented appropriately, interface changing program 116 will display graphical user interface 112A for device remote control app 114A on controlling smart device 110. When controlling smart device 110 is oriented differently, interface changing program 116 may change the displayed graphical user interface from graphical user interface 112A to graphical user interface 112B for device remote control app 114B.

Database 118 may be a repository for storing product information relating to a variety of controllable devices 120. Controllable device product information retained within database 118 may include brand, model, and product type information. Additionally, database 118 may include an image database capable of executing an image recognition search for identification of controllable devices 120 by interface changing program 116.

Figure 2:
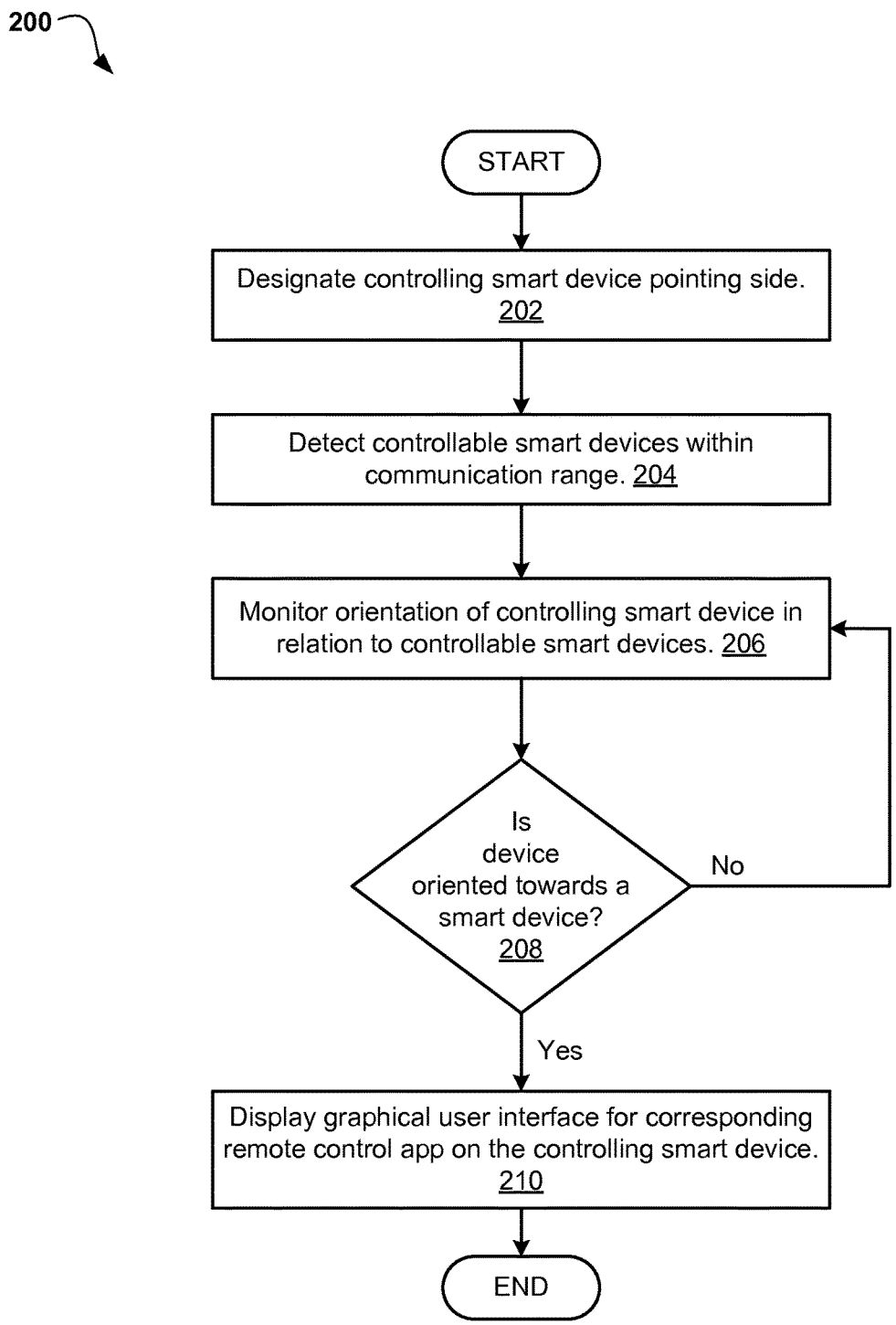
FIG. 2 is a flowchart depicting the operational steps of the device controller system of FIG. 1, in accordance with one embodiment of the present invention.

Referring now to FIG. 2, a flowchart 200 of the operational steps carried out by the device controller system 100 of FIG. 1 is depicted, in accordance with one embodiment of the present invention. In the example embodiment, when first enabling interface changing program 116, a user may be prompted to designate a pointing side of controlling smart device 110 (step 202). When first implementing interface changing program 116, the user may be prompted to designate a side, or plane, of controlling smart device 110 as the pointing side, or orientation side. For example, when the user first implements interface changing program 116, interface changing program 116 may present a three-dimensional rendering of controlling smart device 110 on graphical user interface 112. The user may manipulate the three-dimensional rendering of controlling smart device 110 in order to select a side of the device or a plane to use as the pointing side of controlling smart device 110. The pointing side of controlling smart device 110 may be the portion of controlling smart device 110 that the user orients towards controllable device 120. For example, if a user is utilizing a smartphone as a controlling device and wishes to point the back plate of the smartphone towards a controllable device 120A, 120B to change interfaces when using interface changing program 116, the user will designate the back plate of the smartphone as the pointing side. Additionally, the user may also designate the top plate of the controlling smart device 110 as the pointing side so as to allow the user to orient the controlling smart device 110 towards a controllable device 114 in a similar fashion as a user would orient a typical remote control towards a television.

Interface changing program 116 may then detect controllable devices within communication range of the controlling smart device (step 204). In one embodiment of the present invention, interface changing program 116 may detect controllable devices 120 using image recognition technology. Image recognition technology may refer to analyzing a picture or a video to determine particular aspects of the picture or video, such as room dimensions and the location or identity of specific items. A user may initiate image recognition of each nearby controllable devices 120 by capturing one or more pictures and/or videos of the room in which the user is located. Interface changing program 116 may analyze the one or more pictures and/or videos to determine room dimensions and positional information, such as the location of each controllable device 120, based on the orientation of each device in the one or more pictures and/or videos.

In order to determine the device remote control app 114 corresponding to each controllable device 120, interface changing program 116 may need to determine product information for each controllable device 120. Interface changing program 116 may determine product information for each controllable device 120 by analyzing the one or more pictures and/or videos used to locate each controllable device 120 within the room. Using image recognition, interface changing program 116 may be able to determine the type, brand, and model of each controllable device 120 by accessing a locally stored database of common controllable devices, such as database 118, or conducting a query through a search engine. For example, interface changing program 116 may obtain the type, brand, and model of a television by locating product information within database 118 using image recognition of the television. Additionally, interface changing program 116 may use optical character recognition to determine product identification information. For example, interface changing program 116 may receive a user capture picture of a television. Using optical character recognition, interface changing program 116 may determine a product barcode or product serial number displayed within the user captured picture. Interface changing program 116 may then search database 118 to determine the product identification information necessary to locate device remote control app 114. As previously mentioned, database 118 may be a repository for storing product information relating to a variety of controllable devices 120. Additionally, controlling smart device 110 may determine the product information for each controllable device 120 through wireless communication, such as Bluetooth or WiFi, with each controllable device 120. Establishing a connection between controlling smart device 110 and each controllable device 120 may allow interface changing program 116 receive transmitted product information from each controllable device 120. Once each controllable device 120 is identified and located, interface changing program 116 may store the identity and location of each controllable device 120 for future use.

Interface changing program 116 may use the product information to identify and, if not already installed, retrieve the remote control app 114 for each controllable device 120. Interface changing program 116 may retrieve the remote control app 114 for each controllable device 120 not already downloaded and installed on controlling smart device 110 by searching a repository, such as database 118, or an application store, such as the Apple® (Apple and all Apple-based trademarks and logos are trademarks or registered trademarks of Apple Inc. and/or its affiliates) App Store or the Google® (Google and all Google-based trademarks and logos are trademarks or registered trademarks of Google Inc. and/or its affiliates) Play Store.

Interface changing program 116 then monitors the orientation of the controlling smart device 110 using triangulation to detect the direction in which the pointing side of the controlling smart device is oriented in relation to the nearby controllable devices (step 206). Triangulation may refer to a process of determining the location of an unknown point by measuring angles to the unknown point from other known points. Triangulation may be implemented when detecting each nearby controllable device 120 by calculating the position of controlling smart device 110 in relation to each controllable device 120 within range of controlling smart device 110. By triangulating one or more points on controlling smart device 110, interface changing program 116 may be capable of determining the direction in which controlling smart device 110 is oriented in relation to each controllable device 120 as well as the location of controllable devices 120. For example, using triangulation, interface changing program 116 may locate the position of and pointing direction of a controlling smart device 110 located in a room containing a television, a Blu-Ray player, and a thermostat. Interface changing program 116 may continually monitor the orientation of controlling smart device 110 to determine when the user has pointed controlling smart device 110 at a controllable device 120.

If interface changing program 116 determines the designated pointing side of controlling smart device 110 does not face a controllable device (step 208, "NO" branch), then interface changing program 116 continues to monitor the orientation of controlling smart device 110 (step 206).

If interface changing program 116 determines the designated pointing side of controlling smart device 110 does face a controllable device (step 208, "YES" branch), then interface changing program 116 displays graphical user interface 112 for device remote control app 114 corresponding to controllable device 120 towards which the pointing side of controlling smart device 110 is oriented (step 210). When the user orients the pointing side of controlling smart device 110 towards controllable device 120, interface changing program 116 may determine the user wishes to operate the controls for controllable device 120. Therefore, interface changing program 116 may display graphical user interface 112 for the device remote control app 114 that corresponds to controllable device 120. For example, if interface changing program 116 is monitoring the orientation of controlling smart device 110 in a room where interface changing program 116 has detected a television and a Blu-Ray player as controllable devices 120, interface changing program 116 may run the device remote control app 114 for the television when the user orients the designated pointing side of controlling smart device 110 towards the television. When displaying the graphical user interface 112 of a device remote control app 114 for a controllable device 120, interface changing program 116 may indicate adjacent devices on the display screen of the controlling smart device 110. For example, if controlling smart device 110 from the previous example displays graphical user interface 112 for device remote control app 114 corresponding to the television and the Blu-Ray player is physically located directly below the television, interface changing program 116 will display an indicator, such as an arrow adjacent to the text "Blu-Ray", on the display screen for controlling smart device 110 along the border of graphical user interface 112. Interface changing program 116 may display an indicator on the display screen for controlling smart device 110 when a controllable device 120 is within a preconfigured threshold distance of controlling smart device 110. For example, if a user preconfigures the threshold distance as twenty feet, interface changing program 110 may display an indicator for all controllable smart devices 120 within twenty feet of controlling smart device 110.

In another embodiment of the present invention, interface changing program 116 may change the displayed graphical user interface 112 from when a user selects an indicator. For example, if graphical user interface 112 is displaying device remote control app 114A associated with controllable device 120A and an indicator is also displayed on graphical user interface 112 corresponding to controllable device 120B since controllable device 120B is within a threshold distance of controllable smart device 110, interface changing program 116 may change graphical user interface 112 to display device remote control app 114B associated with controllable device 120B when the user selects the indicator corresponding to controllable device 120B.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:
(a) On-demand self-service: a cloud consumer can unilaterally provision computing capabilities, such as server time and network storage, as needed automatically without requiring human interaction with the service's provider.
(b) Broad network access: capabilities are available over a network and accessed through standard mechanisms that promote use by heterogeneous thin or thick client platforms (e.g., mobile phones, laptops, and PDAs).
(c) Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).
(d) Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.
(e) Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:
(a) Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.
(b) Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.
(c) Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:
(a) Private cloud: the cloud infrastructure is operated solely for an organization. It may be managed by the organization or a third party and may exist on-premises or off-premises.
(b) Community cloud: the cloud infrastructure is shared by several organizations and supports a specific community that has shared concerns (e.g., mission, security requirements, policy, and compliance considerations). It may be managed by the organizations or a third party and may exist on-premises or off-premises.
(c) Public cloud: the cloud infrastructure is made available to the general public or a large industry group and is owned by an organization selling cloud services.
(d) Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 3:
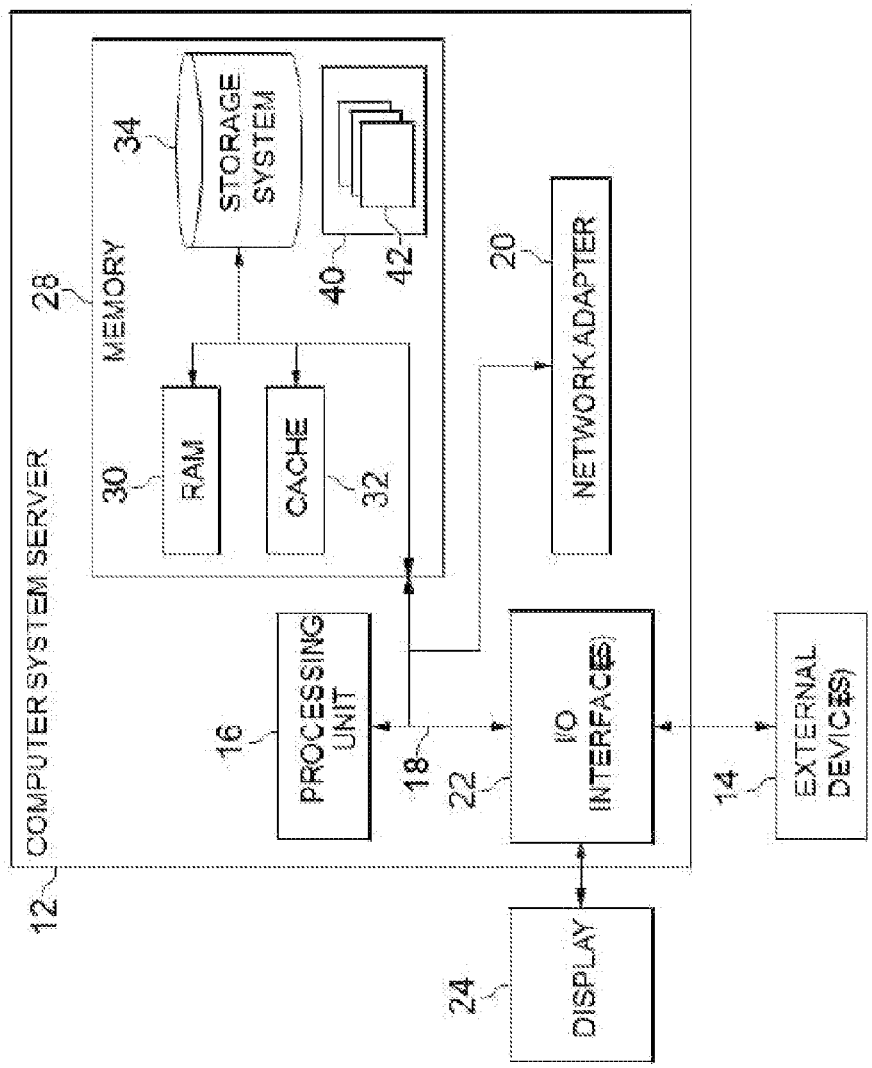
FIG. 3 depicts a cloud computing node according to an embodiment of the present invention.

Referring now to FIG. 3, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
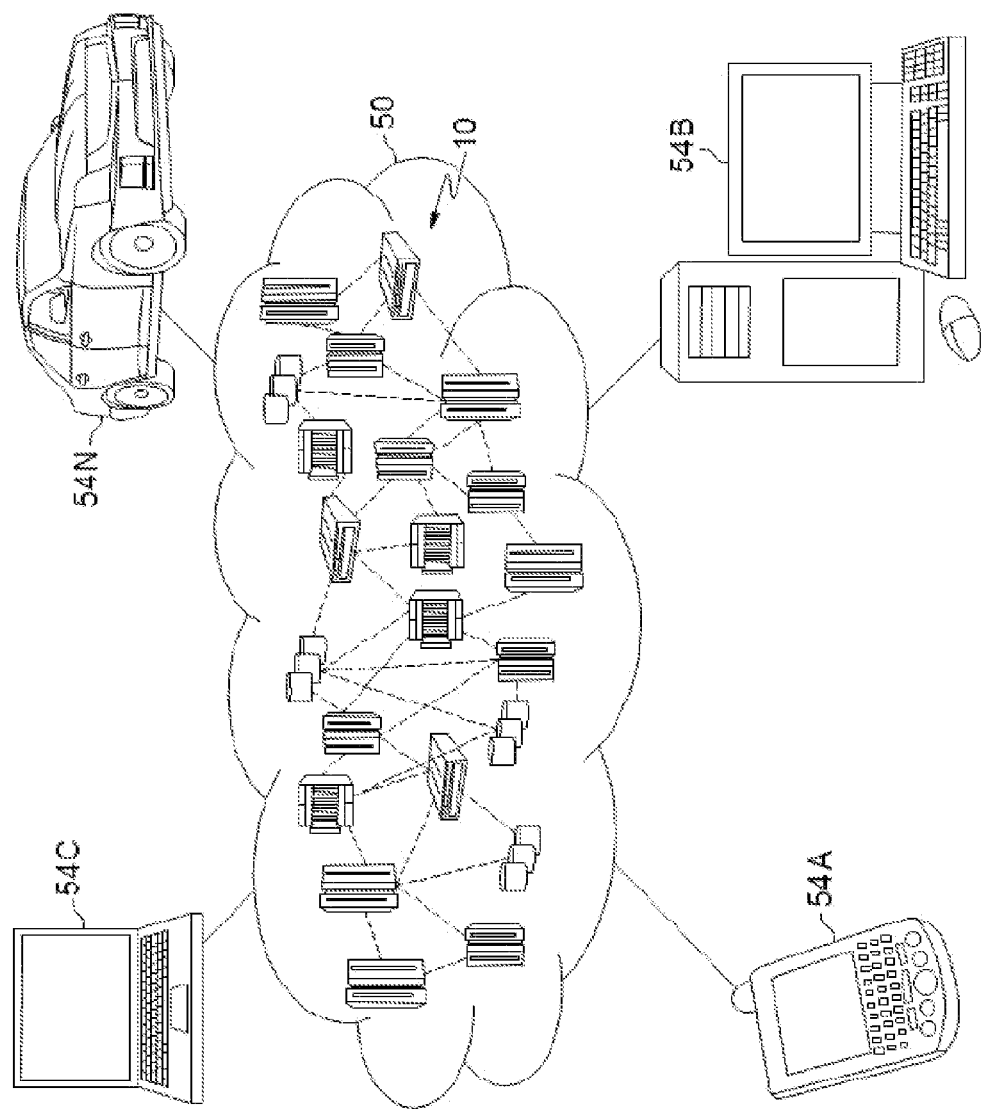
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 5:
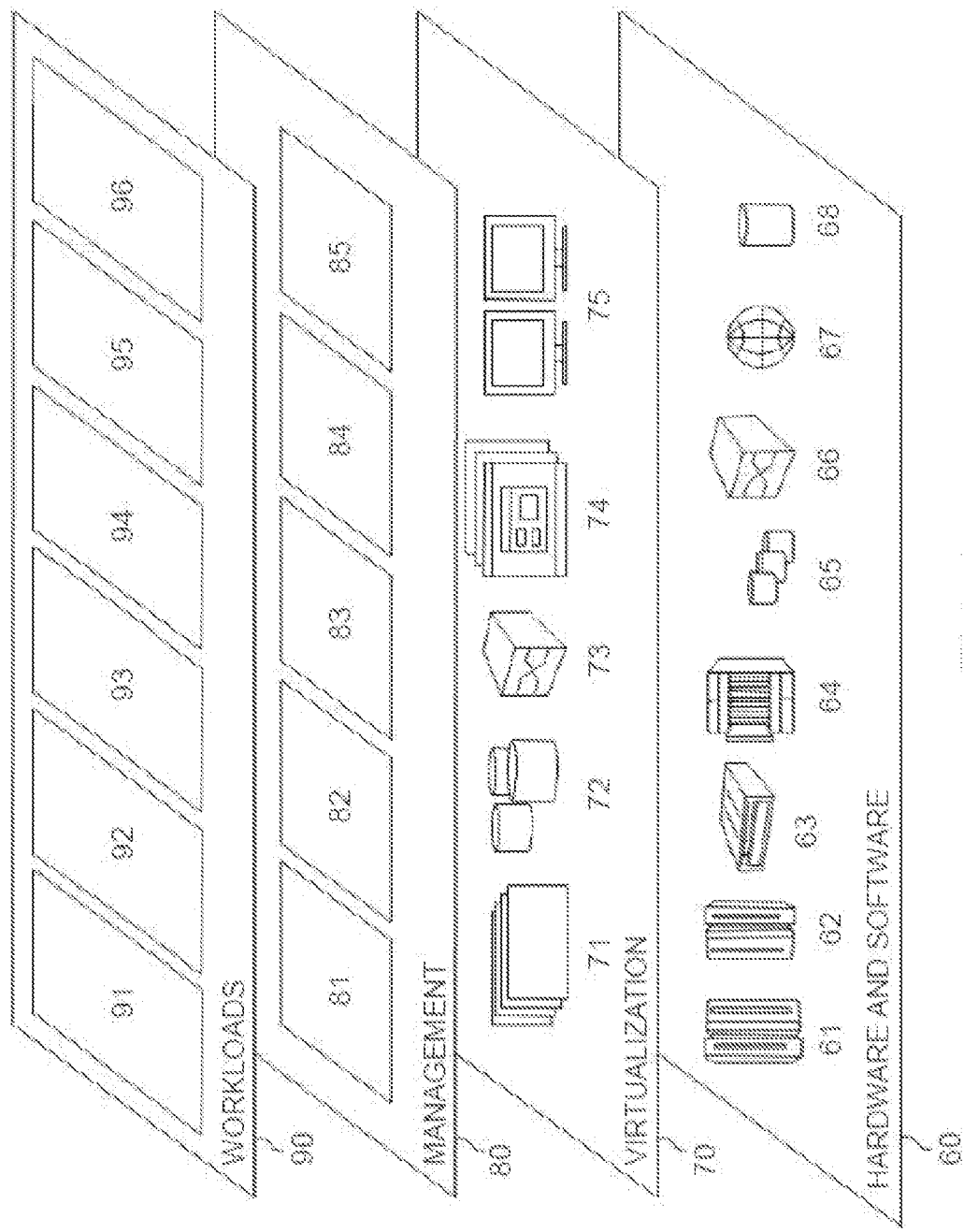
FIG. 5 depicts abstraction model layers according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and device controls 96.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge devices. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or device. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for changing a graphical user interface, the method comprising:
   identifying, by a computer, one or more devices;
   determining, by the computer, product information associated with the one or more devices, wherein the product information includes at least one of a type, a model number, and a brand;
   determining, by the computer, one or more applications associated with the one or more devices based on the product information, wherein the one or more applications allow for operation of the one or more devices;
   retrieving, by the computer, the one or more applications;
   determining, by the computer, that a user preconfigured portion of the computer is oriented toward a first device of the one or more devices, wherein the user preconfigured portion is a side of the computer selected by a user through a plurality of interactions with a three-dimensional rendering of the computer in a graphical user interface; and
   displaying, by the computer, a first graphical user interface corresponding to a first application of the one or more applications that allows for operation of the first device.

2. The method of claim 1, further comprising:
   receiving, by the computer, information detailing a user selection of the portion of the computer.

3. The method of claim 1, wherein identifying the one or more devices includes comparing at least one of one or more pictures and one or more videos of the one or more devices with a database, wherein the database includes at least one of a plurality of pictures of devices and a plurality of videos of devices.

4. The method of claim 1, wherein displaying the first graphical user interface includes displaying one or more indicators denoting at least one device of the one or more devices that are within a preconfigured threshold distance of the first device.

5. The method of claim 1, wherein identifying the one or more devices includes comparing at least one of the one or more pictures and the one or more videos with a database includes identifying at least a portion of the product information through optical character recognition and comparing the at least a portion of the product information with the database, and wherein the database includes a plurality of product identification information.

6. The method of claim 4, further comprising:
   determining, by the computer, the user has selected an indicator of the one or more indicators, wherein the indicator is associated with a second device within the one or more devices;
   displaying, by the computer, a second graphical user interface corresponding to a second application of the one or more applications that allows for remote operation of the second device.

7. The method of claim 1, wherein the one or more applications are retrieved from at least one of an application store and a database.

8. A computer system for changing a graphical user interface, the computer system comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   identifying, by a computer, one or more devices;
   determining, by the computer, product information associated with the one or more devices, wherein the product information includes at least one of a type, a model number, and a brand;

determining, by the computer, one or more applications associated with the one or more devices based on the product information, wherein the one or more applications allow for operation of the one or more devices;

retrieving, by the computer, the one or more applications;

determining, by the computer, that a user preconfigured portion of the computer is oriented toward a first device of the one or more devices, wherein the user preconfigured portion is a side of the computer selected by a user through a plurality of interactions with a three-dimensional rendering of the computer in a graphical user interface; and displaying, by the computer, a first graphical user interface corresponding to a first application of the one or more applications that allows for operation of the first device.

9. The computer system of claim 8, further comprising:

receiving, by the computer, information detailing a user selection of the portion of the computer.

10. The computer system of claim 8, wherein identifying the one or more devices includes comparing at least one of one or more pictures and one or more videos of the one or more devices with a database, wherein the database includes at least one of a plurality of pictures of devices and a plurality of videos of devices.

11. The computer system of claim 8, wherein displaying the first graphical user interface includes displaying one or more indicators denoting at least one device of the one or more devices that are within a preconfigured threshold distance of the first device.

12. The computer system of claim 8, wherein identifying the one or more devices includes comparing at least one of the one or more pictures and the one or more videos with a database includes identifying at least a portion of the product information through optical character recognition and comparing the at least a portion of the product information with the database, and wherein the database includes a plurality of product identification information.

13. The computer system of claim 11, further comprising:

determining, by the computer, the user has selected an indicator of the one or more indicators, wherein the indicator is associated with a second device within the one or more devices;

displaying, by the computer, a second graphical user interface corresponding to a second application of the one or more applications that allows for remote operation of the second device.

14. The computer system of claim 8, wherein the one or more applications are retrieved from at least one of an application store and a database.

15. A computer program product for changing a graphical user interface, the computer program product comprising:

one or more computer-readable tangible storage medium and program instructions stored on at least one of the one or more tangible storage medium, the program instructions executable by a processor, the program instructions comprising:

program instructions to identify, by a computer, one or more devices;

program instructions to determine, by the computer, product information associated with the one or more devices, wherein the product information includes at least one of a type, a model number, and a brand;

program instructions to determine, by the computer, one or more applications associated with the one or more devices based on the product information, wherein the one or more applications allow for operation of the one or more devices;

program instructions to retrieve, by the computer, the one or more applications;

program instructions to determine, by the computer, that a user preconfigured portion of the computer is oriented toward a first device of the one or more devices, wherein the user preconfigured portion is a side of the computer selected by a user through a plurality of interactions with a three-dimensional rendering of the computer in a graphical user interface; and program instructions to display, by the computer, a first graphical user interface corresponding to a first application of the one or more applications that allows for operation of the first device.

16. The computer program product of claim 15, further comprising:

program instructions to receive, by the computer, information detailing a user selection of the portion of the computer.

17. The computer program product of claim 15, wherein identifying the one or more devices includes comparing at least one of one or more pictures and one or more videos of the one or more devices with a database, wherein the database includes at least one of a plurality of pictures of devices and a plurality of videos of devices.

18. The computer program product of claim 15, wherein displaying the first graphical user interface includes displaying one or more indicators denoting at least one device of the one or more devices that are within a preconfigured threshold distance of the first device.

19. The computer program product of claim 15, wherein identifying the one or more devices includes comparing at least one of the one or more pictures and the one or more videos with a database includes identifying at least a portion of the product information through optical character recognition and comparing the at least a portion of the product information with the database, and wherein the database includes a plurality of product identification information.

20. The computer program product of claim 18, further comprising:

program instructions to determine, by the computer, the user has selected an indicator of the one or more indicators, wherein the indicator is associated with a second device within the one or more devices;

program instructions to display, by the computer, a second graphical user interface corresponding to a second application of the one or more applications that allows for remote operation of the second device.

* * * * *